United States Patent [19]
Julien et al.

[11] Patent Number: 4,932,210
[45] Date of Patent: Jun. 12, 1990

[54] SHAPE MEMORY METAL PRECISION ACTUATOR

[75] Inventors: Gerald J. Julien, Puyallup; June L. Creson, Graham, both of Wash.

[73] Assignee: The Boeing Company, Seattle, Wash.

[21] Appl. No.: 234,407

[22] Filed: Aug. 19, 1988

[51] Int. Cl.⁵ .............................................. F03G 7/06
[52] U.S. Cl. ....................................... 60/527; 60/528
[58] Field of Search ......................... 60/527, 528, 529

[56] References Cited

U.S. PATENT DOCUMENTS

| | | |
|---|---|---|
| 2,466,703 | 4/1949 | Harrison et al. |
| 2,560,651 | 7/1951 | Kutzler |
| 3,229,177 | 1/1966 | Clarke |
| 3,940,935 | 5/1976 | Richardson et al. |
| 4,002,954 | 1/1977 | Orlando |
| 4,348,624 | 9/1982 | Anderson et al. |
| 4,551,974 | 11/1985 | Yaeger et al. |
| 4,551,975 | 11/1985 | Yamamoto et al. |
| 4,567,549 | 1/1986 | Lemme |
| 4,586,335 | 5/1986 | Hosada et al. |
| 4,665,334 | 5/1987 | Jamieson |
| 4,700,541 | 10/1987 | Gabriel et al. |
| 4,742,680 | 5/1988 | Mecca |
| 4,772,807 | 9/1988 | Bouvat ............................ 60/527 X |
| 4,829,843 | 5/1989 | Suzuki ............................ 60/527 |

Primary Examiner—Allen M. Ostrager
Attorney, Agent, or Firm—Christensen, O'Connor, Johnson & Kindness

[57] ABSTRACT

A shape memory metal actuator for accurately pointing or aligning a moveable piece of equipment or other object. The memory metal components (12, 14, 16, 18) are stretched along their axes and arranged in a push-pull configuration so that one element (14) in the activated state moves the object while another element (18) on the opposite side of the object is strained while it is in the soft state to act as a dynamic damper to prevent overtravel of the object. The wires can be heated with external heaters or by electrical current passed directly therethrough. Two separate actuator assemblies using orthogonal pairs of shaped memory metal wires (42, 44, 46, 48 and 52, 54, 56, 58) are used to enable pivotal movement about a floating pivot point 41, while a cantilevered arrangement of Nitinol bars (88, 90, 92 and 94) are used to enable pivotal movement about a fixed flexure point F.

24 Claims, 3 Drawing Sheets

SHAPE MEMORY METAL PRECISION ACTUATOR

BACKGROUND OF THE INVENTION

This invention relates to the positioning of objects and, more particularly, to a system which uses shape memory metal alloys to accurately point or align a movable piece of equipment or other object.

Many applications, especially those in the field of aerospace, require an actuator that is capable of positioning an object with a high degree of accuracy. Past efforts to provide such a precision actuator have relied upon various mechanical, hydraulic and electrical devices, such as screws, gears, hydraulic pumps, and direct drive or geared motors. It has been difficult, however, to provide exact positioning of an object with these approaches because of the mechanical errors introduced by the hydraulics, motor drives, gears, and other mechanical components. As a consequence, these prior systems have not been entirely satisfactory.

A series of shape memory metal alloys possess a unique mechanical "memory" which, given the proper conditions, can be restored to their original shape after being "permanently" deformed out of that shape. Notable among these materials is Nitinol, which is an alloy of nickel and titanium. Generally, these alloys have chemical compositions and range from about 53 to 57 weight percent nickel balanced with titanium.

The memory of these materials, i.e., the return of the materials to their original shape, is triggered by heating the alloy to a moderate temperature known as the austenite start temperature, $A_s$. When heated to this temperature, the alloy begins a transformation from a soft, martensitic state to a harder, more dense austenitic state. This transformation continues in a linear manner as further heat is applied up to an ending temperature, known as the austenite final temperature $A_f$, at which the alloy is wholly transformed to austenite. As a consequence of this transformation characteristic, martensitic Nitinol can be plastically deformed from an original shape into an intermediate shape, and then caused to return to the original state by heating it to its transition temperature.

The particular austenite start temperature at which the material returns to its original shape is governed by the nickel/titanium ratio. For Nitinol, this transition temperature can be varied from about $-200°$ C. to over $+120°$ C. Even higher transition temperatures can be provided by doping the Nitinol with other metals. For example, pladimum-doped alloys have transition temperatures in excess of $230°$ C.

Considerable force is exerted by a memory metal alloy as it returns to its original, preset shape. The force so generated is capable of doing significant mechanical work. The amount of work performed and the associated recovery stresses depend on the amount of strain that is induced when the material is plastically deformed from its preset memory shape to the intermediate shape. A Nitinol alloy shape can be strained up to 8% and recovered to the memory set shape upon the application of heat sufficient to meet the alloy's set memory point temperature.

Nitinol has several other advantageous mechanical and physical properties. An interesting feature of the shape memory function of Nitinol is that the speed of recovery to the set shape can be controlled by the rate at which thermal energy is applied. This control capability can be used to stop a shape at any intermediate point during the recovery operation. Thus, with precise thermal control, the speed with which the material moves and the amount of movement of the material can be regulated in a desired manner. Further useful properties of Nitinol include excellent damping characteristics and an electrical resistivity that changes in a predictable fashion over the transformation-temperature range.

SUMMARY OF THE INVENTION

The present invention takes advantage of the mechanical and physical properties of Nitinol and other shape memory metals. In accordance with the invention, the ability to modify the shape of these memory metal alloys by adding or removing thermal energy is harnessed to provide an entirely solid state actuator which can be used to precisely control the amount of movement and positive speed of an object. The invention further harnesses the damping characteristics of these materials to provide a dynamic damper or tensioner that can be used to prevent overtravel of the object. In general, this is accomplished by arranging the memory metal components of the actuator in a push-pull configuration so that one element in the activated (austenitic) state moves the object while another element on the opposite side of the object is strained or stretched while it is in the soft (martensitic) state to act as the dynamic damper.

In accordance with one aspect of the invention, the object to be moved is suspended for coordinate positioning by two orthogonally oriented pairs of shape memory metal elements. In one preferred form, the memory metal elements are Nitinol wires that are resistively heated by electrical currents passed therethrough. One end of each of the wires is attached to the object while the other end is attached to a frame that circumferentially surrounds the object. The points of attachment are such that, in the set-up, or initial, position, the object is at the origin of an x-y coordinate system with the wires radiating outward from the object to the frame at 90° intervals around the object to define the $\pm x$ and $\pm y$ axes. In this initial state each of the Nitinol wires has been stretched along its longitudinal axis a predetermined amount, preferably 4%, from its original shape. This 4% initial strain is stored energy that is released in the form of mechanical work that moves the object.

Suitable insulating connectors are used to attach the wires to the object and frame so that electrical currents can be passed through each separate wire in a desired sequence to selectively heat the wires. Means are included for controlling the magnitude, timing and duration of the electrical currents to the Nitinol wires to control the extent of displacement and positive speed of the object. By activating only one of the Nitinol wires, the object can be moved in a desired direction along either one of the single axes, for example, in a $+x$ direction. Activation of the opposite Nitinol wire will effect movement of the object in the opposite direction along the same axis, for example, in the $-x$ direction. Activation of two of the Nitinol wires, for example, the $+x$ wire and the $+y$ wire, causes off-axis movement to any desired coordinate position.

This arrangement provides not only selective positioning of the object but also damping of the object when stopping on a selected point. This occurs because the nonactivated wire or wires that are attached to the side of the object that lies opposite the direction of motion are in a soft (martensitic) state. As these wires are pulled by the movement of the object, they are stretched or strained beyond their 4% initial strain. This additional strain substantially prevents overtravel and oscillations when stopping the object. According to a further aspect of the invention, further enhancement of the placement and damping operations of the actuator are obtained by simultaneously controlling the shape memory effect of both wires in each pair. This is accomplished by supplying current not only to the wire that pulls the object but also to the wire that is being strained. The result is controlled tensioning or braking of the object being positioned.

According to another aspect of the invention, an object can be made to pivot about a floating pivot point by using two of the frame/Nitinol wire assemblies described above to support the object. By arranging the two assemblies in parallel, i.e., such that Nitinol wires define two orthogonal systems that lie in parallel planes, and by selectively controlling the applied currents, the object can be made to move not only to positions defined by the x-y coordinates but also to pivot about a point that lies at the midpoint of a line that joins the origins of the two coordinate systems. This arrangement is particularly useful for pointing, aligning, or aiming applications, such as the controlled scanning or pointing of a laser. In these applications the ability to pivot the object about the floating pivot point reduces the amount of displacement in the x and y directions that would be required to achieve the same extent of positioning or the same scanned area that could be achieved using a single suspension assembly.

According to additional aspects of the invention, position sensors and electronic feedback control are used to regulate the heating of the appropriate Nitinol wires and thus control the placement of the object. In preferred embodiments the sensors are either linear voltage displacement transducers (LVDTs) or Nitinol wires. When the latter elements are used, the feedback circuitry monitors the changes in the electrical resistance of the Nitinol that occur as the material is strained or retracted.

According to a still further aspect of the invention, a solid, fixed pivot, or flexure, point can be provided by using memory metal bars to suspend an object from a surface. In an exemplary arrangement the object to be moved or positioned is cradled in the outer ends of a plurality of elongate Nitinol bars. The bars are oriented in respective, parallel axes that surround the object and are arranged in pairs so that the bars in each pair lie on opposite sides of the object. The inner ends of the bars are attached at spaced-apart positions on a common surface to define a flexure point on that surface. Heat is selectively applied to the pairs of bars using external heaters, embedded heaters, or by resistance heating with electric current to cause one or more of the bars to retract. The mechanical work generated in this manner causes the object to pivot about the flexure point.

DETAILED DESCRIPTION OF THE PREFERRED EMBODIMENT

Referring to FIGS. 1A-1D, an actuator for the coordinate positioning of an object 10 has four Nitinol wires 12, 14, 16 and 18 that are each connected at one end thereof to a frame 20 by an anchor or tensioner 22. The other end of each of the wires 12, 14, 16 and 18 is attached to the object 10 by any suitable means that provides a connection that is sufficient to withstand forces exerted by the Nitinol wires as they are strained and retracted during operation of the actuator. In a pointing device constructed in accordance with the arrangement here under discussion, mechanical-type compression lugs successfully provided the desired connection between the Nitinol wires and the object.

Figure 1B:
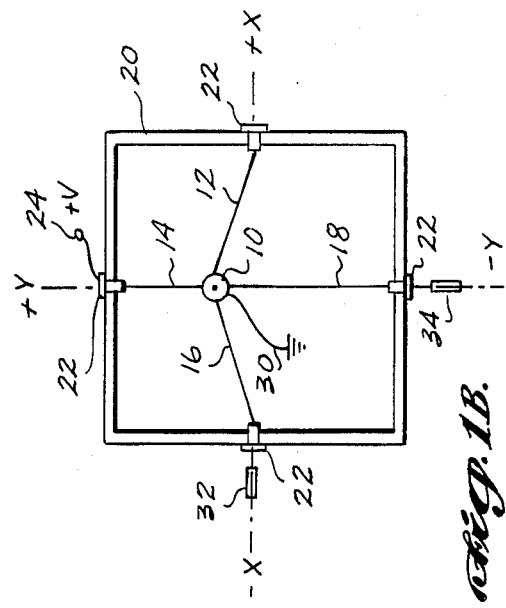
FIGS. 1A-1D are pictorial elevational views of a memory metal coordinate positioning actuator in accordance with the invention.
Figure 1D:
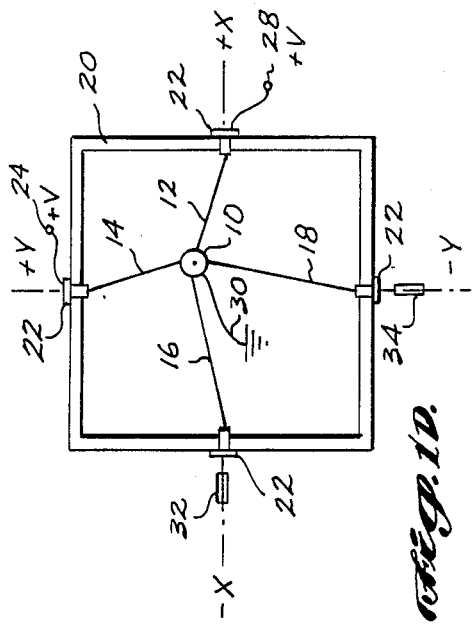
Figure 1A:
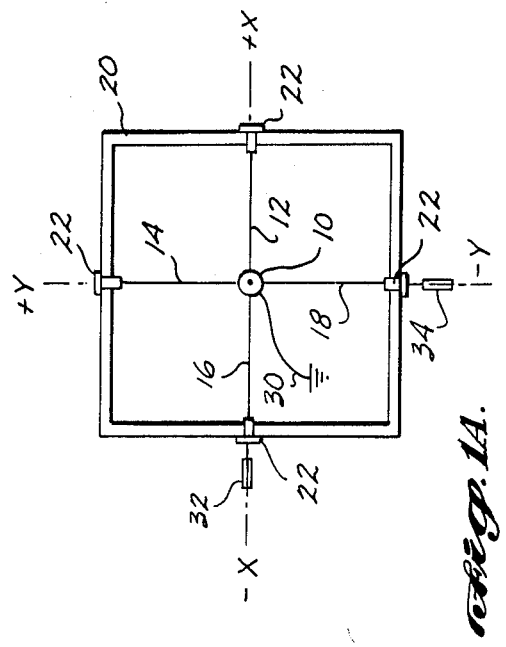
Figure 1C:
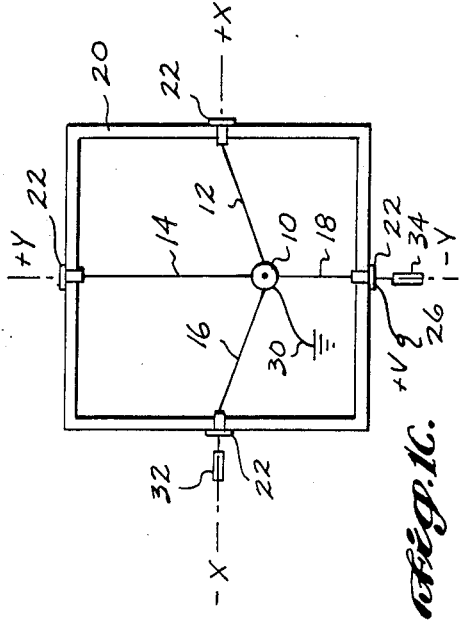

FIG. 1A shows the object 10 in the set-up or initial state. This is an unpowered rest position in which the object 10 lies at the origin of a planar coordinate system having two orthogonal axes, as illustrated by the axes labeled $\pm x$ and $\pm y$, respectively, in FIG. 1A. As will be discussed more fully hereinafter, FIGS. 1B and 1C illustrate positioning of the object along a single axis, in this case the y axis, while FIG. 1D illustrates a coordinate positioning of the object relative to both the x and y axes.

A Nitinol alloy shape can be strained up to 8% from its preset or memory set shape and recover to that set shape upon the application of heat sufficient to reach the alloy's transition temperature, i.e., the austenite start temperature $A_s$. To take advantage of this characteristic, each of the Nitinol wires 12, 14, 16 and 18 is prestrained 4% in the set-up position illustrated in the FIG. 1A. This 4% initial strain is induced by stretching, i.e., plastically deforming, each of the wires an additional 4% of its length while it is in a martensitic form.

As a consequence of the 4% initial strain, the object 10 can be forced to move in any of the four possible directions by heating one or more of the Nitinol wires 12, 14, 16 or 18 to the transition temperature of the alloy. When the Nitinol wires are so heated, they return to their preset shape, i.e., they retract all or a portion of the 4% initial strain, or increase in length, that each wire has in the set-up state illustrated in FIG. 1A. The force generated when the activated wire returns to its memory shape pulls the object outward toward the frame along the axis defined by the activated Nitinol wire.

FIG. 1B illustrates movement of the object 10 along the $\pm y$ axis that occurs when wire 14 is heated to its transition temperature. FIG. 1C illustrates movement of the object along the $-y$ axis occasioned by activation of wire 18 whereas FIG. 1D illustrates coordinate movement or positioning of the object relative to both the $+x$ and $+y$ axes that results from simultaneously activating wires 12 and 14. It will be appreciated that, subject to the physical constraints of the Nitinol wires and the physical configuration of the actuator, the object 10 can be moved to and held at any desired position throughout the plane of the coordinate system by selectively heating one or more of the wires.

In the embodiment illustrated in FIGS. 1A-1D, heat is applied to the wires by passing an electric current therethrough, or by applying a voltage across the wires. Since the Nitinol alloy is electrically resistive, the applied current generates heat. Nitinol characteristically has a higher resistance in its soft (martensitic) state than it does in its hardened (austenitic) state. While the actual resistance of the Nitinol at any given temperature depends upon the composition of the alloy, it, in general, decreases with increasing temperature. The resistance of a given alloy at a given temperature can be discerned using known measurement and calibration techniques.

These resistive characteristics can be used advantageously to control not only the amount of thermal energy that is applied to the wires but also the rate at which the energy is so applied. This is accomplished by controlling the timing, magnitude, and duration of the electric current supplied to each of the wires. This control capability enables precise control over the extent and speed of recovery of the alloy to its original set shape. Thus, with precise thermal control, an object can be stopped at any intermediate point during its recovery and can be held at a desired point for any length of time.

Those skilled in the art will readily appreciate the manner in which conventional power supplies and electronic control techniques can be used to regulate the current applied to the Nitinol wires. It will be further appreciated that the Nitinol wires should be electrically connected to the control and power systems in a manner so that each wire can be separately addressed, i.e., separately controlled with an electric current or voltage. To facilitate illustration of the invention, FIGS. 1A-1D are simplified pictorials in which the details of the electrical connections have been omitted. The application of the electrical currents are, however, illustrated by the power terminals 24, 26 and 28 which are connected to a source of electrical power indicated by the label +V. To complete the electrical circuit, the terminals are connected to a ground through the Nitinol wires and a grounding wire 30.

Besides the electrical resistive characteristics, the other principal factor influencing the implementation of the control circuit is the transformation characteristics of the particular Nitinol alloy used for the wires 12, 14, 16 and 18. Below a temperature designated as martensite final, $M_f$, Nitinol is wholly transformed to a martensitic state. For a typical Nitinol alloy, $M_f$ is about 44° C. so that the alloy is martensitic at room temperature. The transformation of the Nitinol to the martensitic state occurs at a slightly higher temperature known as the martensite start temperature, $M_s$. For a typical alloy, the beginning temperature of the martensitic transformation $M_s$ is about 57° C. For the object positioner under discussion, the time required to cool the wires from the beginning temperature $M_s$ to the final martensite temperature $M_f$ is a limitation on the recycling speed of operation of the device. Another limitation that affects the operation of the actuator is the time required to heat the Nitinol wires from the ambient temperature to the temperature at which the transformation to austenite begins. The beginning temperature of the austenite transformation is referred to as the austenite start temperature, $A_s$, and is about 97° C. for a typical Nitinol alloy. The transformation to austenite is completed at a higher austenite final temperature designated $A_f$. Typically, this final temperature is about 109° C. In operation, when the Nitinol is heated to the austenite start temperature $A_s$, the transformation to austenite occurs almost instantaneously. This results in an immediate increase in the density of the material, typically a jump from about 20 ksi to about 80 ksi, so that the material hardens and begins its return to its original shape.

The time required for these various transformations is dependent upon the ratio of nickel and titanium in the Nitinol, the temperature of the operating environment of the actuator, and the speed with which thermal energy can be applied to the material. In the case of electrical resistive heating, the speed with which thermal energy can be applied to the Nitinol wires is principally a function of the amount of current that can be delivered by the power source. Extremely high speeds of operation are possible, however, since Nitinol is capable of transforming from a nonmemory to a memory state, i.e., from a martensitic state to an austenitic state, in less than 1 millisecond if the power system can supply the required current.

The configuration illustrated in FIGS. 1A-1D is further desirable because it takes advantage of the excellent natural damping characteristics of Nitinol to dampen the object when it is brought to a stopped position. For this purpose, the two x-axis wires 12 and 16 and the two y-axis wires 14 and 18 are paired in a complementary push-pull configuration so that whenever one wire in the pair is being retracted, the opposite wire in the pair is being stretched or strained. For example, in FIG. 1B, wire 18 is in a soft martensitic state and is strained by the force generated by wire 14 with which wire 18 is paired. At the moment in time shown in FIG. 1B, wire 14 is in the activated austenitic state as a result of current applied through terminal 24.

When starting from the zero point (FIG. 1A) the soft martensitic wires are relatively easy to pull or stretch. As these wires are further stretched, however, they become increasingly more difficult to pull. This increase in strain on a given wire causes that wire to act as a damper to substantially eliminate oscillations and substantially prevent overtravel when the object is brought to a stop from a moving condition.

As noted above, the Nitinol wires are initially stretched an additional 4% of their length. This represents one-half of the maximum 8% strain that can be applied to these wires. From this, it will be seen that the movement of the object 10 is confined from a percentage of length standpoint, to overall movement in the x or y direction a distance that is equal to 8% of the length of one of the Nitinol wires. Viewed differently, the object 10 is restricted to movement in any one of the four directions ($\pm x$ or $\pm y$) a distance that is equal to 4% of the length of one of the Nitinol wires, this distance being measured from the zero point defined by the position of the object in the starting point shown in FIG. 1A.

For even further enhanced control over the positioning of the object and the damping of performance of the actuator, the two wires in a given pair are simultaneously controlled by the application of a controlled electric current. Under this approach, the wire being strained, for example, wire 18 in FIG. 1B or wire 16 and 18 in FIG. 1D, would receive an electrical current while they are being strained by the wire(s) on the opposite side of the object. Prior to the application of current, the wires that are being stretched, for example, wire 18 in FIG. 1B, are in the martensitic phase. When current is applied to this wire, it causes the Nitinol to go into an austenitic phase and, thereupon, to start retracting. By properly selecting the amount of current and the timing of its application, a controlled tension is applied to the object being positioned. This controlled tensioning provides an extremely effective means of braking the motion of the object by controlling the speed and extent of the displacement of the Nitinol wires.

In applications where a high degree of precision positioning is required, it is desirable to supplement the positive positioning control with a feedback control system. This requires the addition of sensors to detect the movement of the object in the x and y directions and feedback control circuitry to monitor the detected motion and provide suitable corrective error signals. In an actuator for positioning a laser head that was built in accordance with the invention, two mechanical linear voltage displacement transducers (LVDTs) were used as sensors to monitor the position of the laser head. During positioning operations, the resistance changes generated in the LVDTs were monitored by position-sensing electronics and used as feedback signals to control the heating of the appropriate Nitinol wire and thus placement of the laser beam. The LVDTs used in this particular device were aligned in a predetermined manner with the x and y axes. This arrangement is pictorially illustrated in FIGS. 1A-1D where LVDTs 32 and 34 are shown to be aligned with the x and y axes, respectively. It is to be appreciated that, in a working device, the LVDTs cannot occupy the same space as the Nitinol wires and, accordingly, must be aligned in a slightly offset position from the x and y axes.

It is to be understood that other types of sensors can be used in place of the LVDTs. For example, separate Nitinol wires could be connected in an appropriately aligned axial orientation to function as a solid state sensor. The changes in electrical resistivity of the wires can be monitored to provide an electrical signal for feedback control.

In a number of applications, it is desirable to have the ability to move the object relative to a pivot point. Examples of such applications include actuators for pointing a laser or a camera. To achieve the desired pivoting, a dual actuating arrangement such as that illustrated in FIGS. 2 and 3 can be utilized. In this arrangement, a laser head 40 is controllably pivoted about a floating pivot point 41 by two independently operable Nitinol wire assemblies of the type described in conjunction with FIGS. 1A-1D. The first actuator subassembly is attached to the forward portion 43 of the laser head and has four Nitinol wires 42, 44, 46, and 48 that define the +x1, +y1, −x1, and −y1 axes, respectively, of a first planar coordinate system. Four other Nitinol wires 52, 54, 56, and 58 are attached to the rear portion of the laser head 40 to define the +x2, +y2, −x2, and −y2 axes, respectively, of a second planar coordinate system. The two planar coordinate systems are parallel to one another and perpendicular to a center axis of the laser head 40 that intersects the origin of the two sets of axes. Through suitable application of heat, the Nitinol wires 42, 44, 46, 48, and 52, 54, 56, and 58 can be selectively activated in a desired sequence relative to the x1−y1 and x2−y2 coordinate axes or to pivot about the floating pivot point 41. It will be seen that this arrangement provides a degree of flexibility, enabling, in this case, the laser head to scan in a two-dimensional linear pattern, to sweep through a cone, or to do both.

Figure 2:
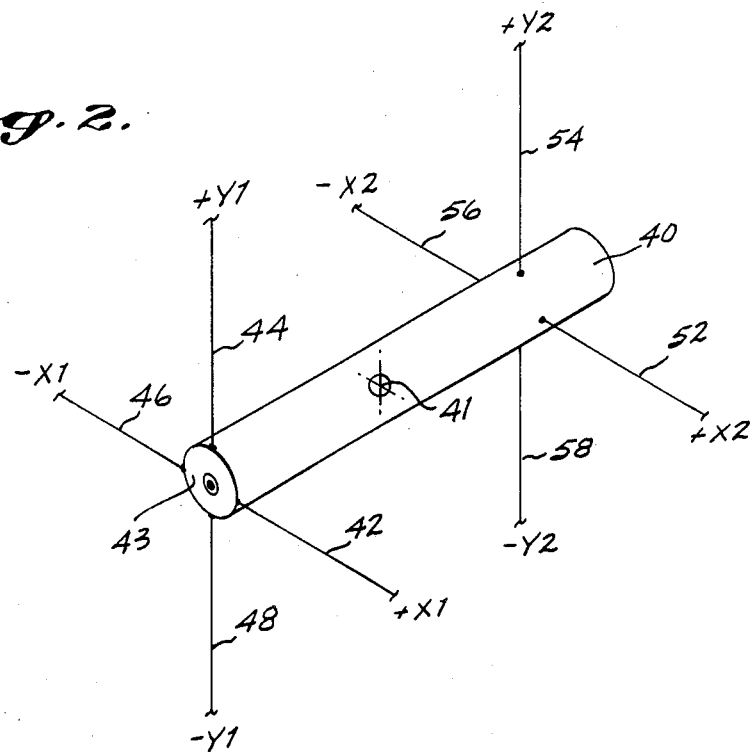
FIG. 2 is a pictorial diagram illustrating the manner in which two memory metal coordinate positioning actuators are arranged to provide a floating pivot point for a suspended object.
Figure 3:
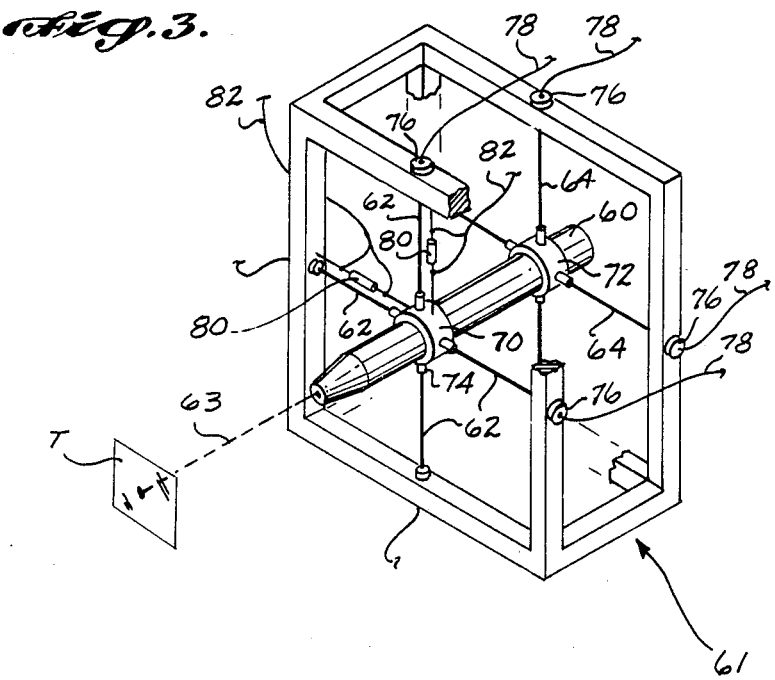
FIG. 3 is a pictorial perspective view, with parts broken, of a positioning actuator constructed in accordance with the principles illustrated in FIG. 2.

FIG. 3 is a simplified pictorial representation of a pointing actuator constructed and operating in accordance with the principles discussed with reference to FIG. 2. A laser head 60 is suspended from a frame 61 by four front Nitinol wires 62 and four rear Nitinol wires 64. At their inner ends, each of the front wires 62 is attached to a forward yoke 70, while each of the inner ends of the rear Nitinol wires 64 is attached to a rear yoke 72. The attachment of the wires to the two yokes is via electrically insulative connectors that serve to electrically isolate each of the wires and to securely attach the wire to the laser head. The outer ends of each of the wires 62 and 64 is attached to the frame 61 through an anchor 76. In the figure, each of the anchors 76 is shown as having a wire 78 attached thereto. This is for illustrative purposes to indicate that each of the wires 62 and 64 is selectively connectable to a source of power so that any one or all of these wires can be resistively heated by an electric current. For clarity of illustration, the additional electrical conductors needed to complete the current through the Nitinol wires are omitted from FIG. 3. It will be further appreciated that, to have each of the Nitinol wires separately addressable, it is necessary that the connection between the conductors 78 and the wires be insulated from the frame 61. For this purpose, the anchors 76 can be isolated by insulation from the frame or can be provided with an insulative internal passageway through which the Nitinol wires or the conductor 78 can be passed for connection with the other. To monitor the x and y movement of the laser head, two LVDTs 80 are connected between the forward yoke 70 and the frame 61. During operation, displacement of the mechanical arm of these LVDTs changes the resistance of these elements, which resistance change is detected as a feedback signal over conductors 82 by a feedback control system (not shown). Using the energizing techniques discussed above in conjunction with FIG. 2 and the embodiment of FIGS. 1A-1D, the laser head 60 can be precisely controlled so that the laser beam 63 can be directed to any desired point on the target T.

Figure 4:
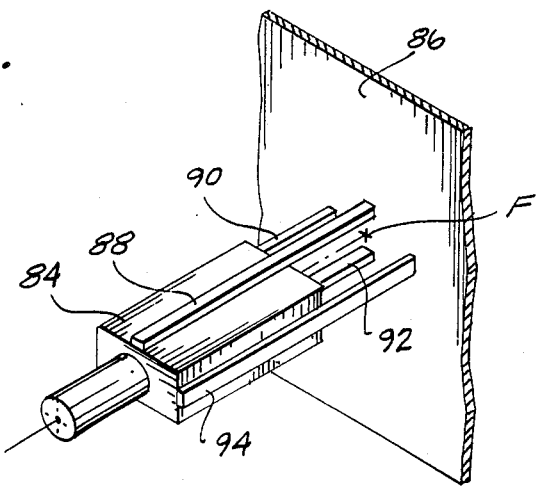
FIG. 4 is a pictorial perspective view of a memory metal positioning actuator that utilizes four memory metal bars to provide a fixed pivot point.

In some applications, it would be particularly desirable to have the capability of precision, point, or align an object by rotating an object about a solid, fixed pivot point or flexure point so that the actuator has no moving parts. The present invention enables the provision of such a fixed flexure point. An example of a suitable arrangement for this purpose is shown in FIG. 4, where a laser head 84 is attached in a cantilevered manner to a support surface 86 by four elongate memory metal bars 88, 90, 92, and 94. The memory metal bars are arranged in pairs, with bars 88 and 92 forming one pair and bars 90 and 94 forming the other pair. Each of the bars has a longitudinal axis that is aligned parallel to a central, longitudinal axis A of the laser head 84. Suitably, the axis A is the axis of the laser beam emitted by the laser head 84. The inner end of each of the four memory metal bars is rigidly attached to the support surface 86. As a consequence of the positioning of the four memory metal bars 88, 90, 92, and 94, and the alignment of their axes relative to the axis A, a flexure point F is defined on the face of the support surface 86. By selectively applying heat to one or more of the memory metal bars the laser head can be caused to pivot about flexure point F and to stop at a desired orientation to point the laser beam in a desired direction or to align it with a particular target.

The manner in which the pairs 88 and 92 and 90 and 94 of the memory metal bars can be cooperatively energized to angularly move the laser head 84 is conceptually similar to the manner in which the pairs of wires 12 and 16 and 14 and 18 in FIGS. 1A–1D are energized to move the object 10 in that embodiment. Just as the pairs of wires can be activated in a complimentary manner to push and pull the object 10, the pairs of bars in the FIG. 4 embodiment can be activated in a complimentary manner so that one of the bars, for example, bar 88, is activated to "pull" the laser head 84 in an angular direction while the opposite bar in the pair, bar 92, is stretched and thus dampens the motion. A positive, dynamic damping or tensioning is provided by heating the opposed bar, for example, 92, while it is being strained.

It will thus be appreciated that the FIG. 4 embodiment is a push-pull arrangement in which the selectively activated memory metal elements push and pull along a different axis. This is to be contrasted with the arrangement in FIGS. 1A–1B in which the complimentary pair of memory metal elements push and pull along the same axis.

Although not illustrated in FIG. 4, it is to be understood that any suitable means can be used to heat the memory metal bars 88, 90, 92, and 94. For this purpose, resistive heating such as that discussed in conjunction with FIG. 1A can be utilized as can be embedded heaters or external heating devices.

Figure 5:
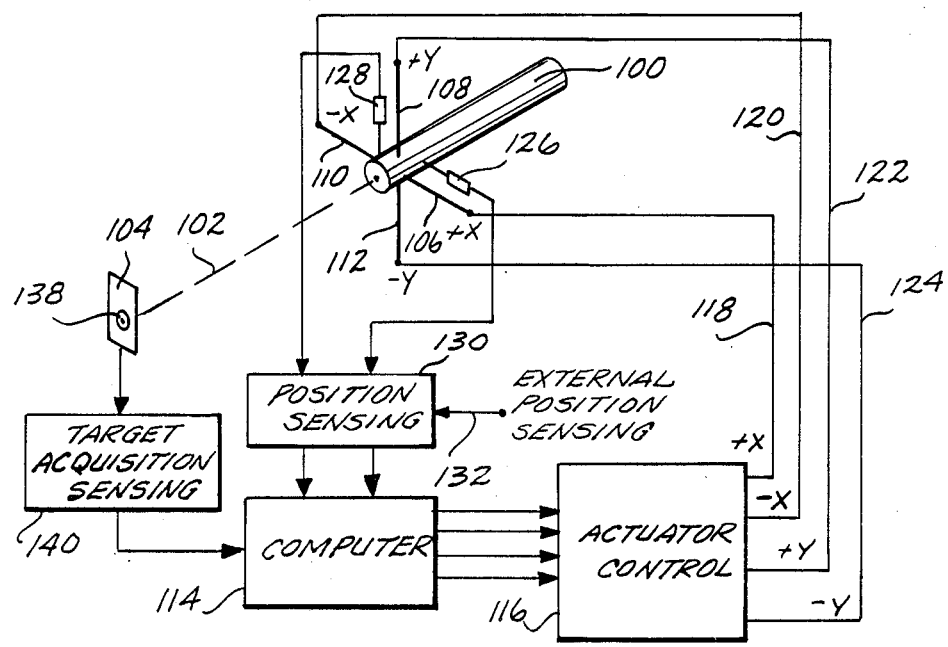
FIG. 5 is a part pictorial, part block diagram of an illustrative actuation system for controlling the positioning of a laser.

FIG. 5 shows the inventive memory metal actuator integrated into a computer controlled actuation system for precisely controlling the position of a laser 100 to direct the laser beam 102 to a target 104. The actuator subassembly has four Nitinol wires 106, 108, 110 and 112 arranged in an x-y coordinate pattern to effect and affect movement in the +x, +y, −x, and −y directions, respectively. Responding to commands from a control computer 114, an actuator control circuit 116 generates voltage control signals and selectively applies these signals to the Nitinol wires 106, 108, 110 and 112 over control leads 118, 120, 122 and 124, respectively. These control voltages have sufficient amplitude to heat the wires to their activation temperatures in accordance with the principles discussed above.

An x direction sensor 126 and a y direction sensor 128 are attached to the laser 100 and a support surface (not shown) to sense the extent of displacement in the x and y directions, respectively, of the laser. Electrical signals developed by these sensors are fed back to the control computer through a position sensing circuit 130 which performs A to D conversion and conditioning of these signals. The position sensing circuit 130 also includes an additional external position sensing input 132 for receiving position information from a source external to the actuator/laser subassembly. By way of example, this external position input signal can be coordinate positioning information obtained from a radar system.

Acquisition of the target 104 by the beam 102 is sensed by a light sensitive detector 138, such as an optical quad diode, and fed to the control computer 114 through a target acquisition sensing circuit 140 which performs signal conditioning and A to D conversion.

An actuator control system constructed in accordance with the arrangement of FIG. 5 (with the exception of the external position sensing input) was used in a controlled laboratory environment with temperature control to 1° F. and a shock-isolated floor. A quad diode used as the acquisition target sensor 138 was a standard device used for precision boresighting and had a resolution of 0.0005 inches. The Nitinol wires were 0.032 inches in diameter and were constructed from an alloy having an austenite final temperature of 120° C. The system was tested to determine stability while on the diode target, repeatability, long-term stability, and overshoot upon target acquisition. The ability of the system to point the laser beam was well within an initial goal of a tolerance of 50 microradians. The observed stability while on the target was less than 5 microradians for short times on target; i.e., 1–3 seconds with repeated scanning. Long-term stability (drift) for 5 minutes was less that 10 microradians and overshoot when approaching target acquisition was less that 2 microradians. With the electronic system used, repeatability was less than 30 microradians, with repeat scanning conducted at 5-second intervals. It is believed that the system's performance would improve significantly if the electronics and packing design were upgraded.

From the foregoing, it will be appreciated that the invention provides a memory metal actuator that can be used to accurately move, point, or align equipment or other movable objects. While the preferred embodiments of the invention have been described, it will be understood by those skilled in the art that various changes can be made therein without departing from the spirit and scope of the invention. For example, memory metal materials other than Nitinol can be used for the active wire or bars. These memory metal materials include copper-zinc-aluminum alloys, copper-aluminum-nickel alloys, and alloys of iron-manganese-chromium-silicon. Furthermore, various shapes of memory materials can be used in addition to the wires and rods discussed herein. These alternative shapes include hollow tubes, sheets, and foils of memory material. Moreover, a variety of feedback devices in the system can be readily used in place of those here described. For example, suitable sensors for detecting the movement of the object include strain gauges, optical sensors, and magnetic devices. Where the temperature of the operating environment is a concern, it would be desirable to include temperature compensating circuitry in the control system. It is also within the purview of the invention to use the controlled application of cooling to regulate the direction and/or speed of the object.

While the orthogonal push-pull arrangement of opposing memory metal wires has a measure of elegant simplicity, other arrangements are contemplated by the invention, including the use of memory metal actuators that are aligned along more than two axes and the use of more than two frame/Nitinol wire assemblies. Further, instead of using an opposing memory metal element to provide tension for the pulling or activated memory metal element, an opposing spring can be used. These modifications, as well as others, are intended to fall within the scope of the following claims.

The embodiments of the invention in which an exclusive property or privilege is claimed are defined as follows:

1. An actuator comprising:
   a pair of wires made of shape memory metal, each of said wires being stretched along its longitudinal axis from a memory length to an intermediate length, each of said wires recovering to said memory length when heated to a predetermined activation temperature, one end of each wire being fixed to a support structure, the other end of each wire being attached to an object to be moved, said wires supporting the object from said support structure, said wires being attached at different points on said object to develop opposing forces on the object when either one of the wires is heated to said activation temperature; and means for heating one of said wires to said activation temperature.

2. The actuator of claim 1, further comprising means for heating the other one of said wires to said activation temperature.

3. The actuator of claim 2, wherein said means for heating said wires each comprises means for selectively applying an electrical current to said wires.

4. The actuator of claim 1, wherein said wires are attached on opposite sides of said object and oriented so that their longitudinal axes are coaxial.

5. The actuator of claim 1, wherein said pair of wires is a first pair of wires and further including:

a second pair of wires made of shape memory metal, each of the wires in said second pair being stretched along its longitudinal axis from a memory length to an intermediate length, each of the wires in said second pair recovering to its memory length when heated to a predetermined activation temperature, one end of each wire in said second pair being attached to said support structure, the other end of each wire in said second pair being attached to said object, the wires in said second pair cooperating with the wires in the first pair to suspend the object from said support structure, the wires in said second pair being attached to said object at different points from each other and from the wires in said first pair to develop opposing forces on said object when either one of said wires is heated to said activation temperature; and means for heating one of the wires in said second pair to said activation temperature.

6. The actuator of claim 5, further comprising means for heating the other one of the wires in said second pair to said activation temperature.

7. The actuator of claim 6, wherein said means for heating said wires each comprises means for selectively applying an electrical current to said wires.

8. The actuator of claim 7, wherein the wires in said second pair are attached on opposite sides of said object and oriented so that their longitudinal axes are coaxial.

9. The actuator of claim 8, wherein the wires in said first pair are attached on opposite sides of said object and oriented so that their longitudinal axes are coaxial, and wherein the longitudinal axes of the first pair of wires are perpendicular to the longitudinal axes of the second pair of wires.

10. An actuating system comprising:

a pair of actuator elements made of shape memory metal, each of said actuator elements being stretched along an axis thereof from a memory length to an intermediate length, each of said actuator elements recovering to said memory length when heated to a predetermined activation temperature, one end of each actuator element being fixed to a support structure, the other end of each actuator element being attached to an object to be moved, said actuator elements suspending the object from said support structure, said actuator elements being attached at different points on said object to develop opposing forces on the object when either one of the actuator elements is heated to said activation temperature;

means for selectively applying a control voltage to one of said actuator elements to heat that element to its activation temperature, thereby to move said object.

11. The actuating system of claim 10, further comprising:

sensing means for generating electrical position signals indicative of the extent of movement of said object.

12. The actuating system of claim 11, further comprising:

control means responsive to said position signals for generating said control voltages.

13. The actuating system of claim 12, wherein said sensing means comprises:

a sensing element made of shape memory metal, said sensing element being attached to said object and said support structure so as to be stretched and compressed in response to movement of said object; and means for sensing the electrical resistance of said sensing element and generating an electrical signal indicative thereof.

14. The actuating system of claim 10, further comprising means for selectively applying a control voltage to the other one of said actuator elements to heat that element to its activation temperature.

15. The actuating system of claim 14, further comprising:

sensing means for generating electrical position signals indicative of the extent of movement of said object; and a software controlled computer responsive to the electrical position signals from said sensing means for selectively applying control voltages to said actuator elements.

16. The actuating system of claim 10, wherein said actuator elements are attached on opposite sides of said object and oriented so that their axes are coaxial.

17. The actuating system of claim 16, wherein said pair of actuator elements is a first pair of actuator elements and further including:

a second pair of actuator elements made of shape memory metal, each of the actuator elements in said second pair being stretched along an axis thereof from a memory length to an intermediate length, each of the actuator elements in said second pair recovering to said memory length when heated to a predetermined activation temperature, one end of each actuator element in said second pair being fixed to a support structure, the other end of each actuator element in said second pair being attached to an object to be moved, the actuator elements in said second pair cooperating with the actuator elements in said first pair to suspend the object from said support structure, the actuator elements in said second pair being attached at different points on opposite sides of said object and oriented so that their axes are coaxial, to develop opposing forces on the object when either one of the actuator elements is heated to said activation temperature; and means for selectively applying a control voltage to one of the actuator elements in said second pair to heat that element to said activation temperature.

18. The actuating system of claim 17, further comprising:

means for selectively applying control voltages to the other ones of the actuator elements in said first and second pairs to heat those elements to said activation temperatures.

19. The actuating system of claim 18, further comprising:
sensing means for generating electrical position signals indicative of the extent of movement of said object; and
a software controlled computer responsive to the electrical position signals from said sensing means for selectively applying control voltages to said actuator elements.

20. The actuating system of claim 19, wherein the axis of said first pair of actuating elements is perpendicular to the axis of said second pair of actuating elements.

21. An actuator comprising:
a first pair of wires made of shape memory metal, one end of each wire being fixed to a support structure, the other end of each wire being attached to an object to be moved, said wires supporting the object from said support structure, said wires being attached at different points on said object to develop opposing forces on the object when either one of the wires is heated to an activation temperature;
means for heating one of said wires in said first pair to said activation temperature;
a second pair of wires made of shape memory metal, one end of each wire in said second pair being attached to said support structure, the other end of each wire in said second pair being attached to said object, the wires in said second pair cooperating with the wires in said first pair to suspend the object from said support structure, the wires in said second pair being attached to said object at different points from each other and from the wires in said first pair to develop opposing forces on said object when either one of said wires is heated to an activation temperature; and
means for heating one of the wires in said second pair to said activation temperature.

22. The actuator of claim 21, further comprising means for heating the other one of said wires in said first pair to said activation temperature and means for heating the other one of said wires in said second pair to said activation temperature.

23. The actuator of claim 21 wherein the wires in said second pair are attached on opposite sides of said object and oriented so that their longitudinal axes are coaxial.

24. The actuator of claim 23, wherein the wires in said first pair are attached on opposite sides of said object and oriented so that their longitudinal axes are coaxial, and wherein the longitudinal axes of the first pair of wires are perpendicular to the longitudinal axes of the second pair of wires.

* * * * *